(12) United States Patent
Cho

(10) Patent No.: US 8,509,930 B2
(45) Date of Patent: Aug. 13, 2013

(54) DATA PROCESSING METHOD FOR AUDIO DATA PLAYBACK, AUDIO DATA PLAYBACK METHOD AND AUDIO DATA PLAYBACK DEVICE

(75) Inventor: Chul-Lae Cho, Gumi-si (KR)

(73) Assignee: MTekvision Co., Ltd., Seoul (KR)

( * ) Notice: Subject to any disclaimer, the term of this patent is extended or adjusted under 35 U.S.C. 154(b) by 378 days.

(21) Appl. No.: 12/883,725

(22) Filed: Sep. 16, 2010

(65) Prior Publication Data

US 2011/0066264 A1 Mar. 17, 2011

(30) Foreign Application Priority Data

Sep. 17, 2009 (KR) .................... 10-2009-0088031

(51) Int. Cl.
*G06F 17/00* (2006.01)
(52) U.S. Cl.
USPC ............................................................. 700/94
(58) Field of Classification Search
USPC .................. 700/94; 704/500–504; 369/1–12
See application file for complete search history.

(56) References Cited

U.S. PATENT DOCUMENTS

2006/0010472 A1* 1/2006 Godeny ........................ 725/62
2010/0023637 A1* 1/2010 Kamath et al. ................ 709/231

FOREIGN PATENT DOCUMENTS

KR 10-2000-0060285 A 10/2000
KR 10-2004-0026745 A 4/2004

* cited by examiner

*Primary Examiner* — Andrew C Flanders
(74) *Attorney, Agent, or Firm* — Birch, Stewart, Kolasch & Birch, LLP

(57) ABSTRACT

A data processing method for audio playback, an audio playing method, and an audio player are provided. The data processing method for audio playback in an application processor includes: reading n-th audio data (where n is a natural number of 1 or more) which is an n-th part of one or more audio files, which is selected in accordance with a user command, from a storage unit; decoding the read n-th audio data; and storing the decoded n-th audio data in an m-th buffer of an audio playing unit at a subsequent stage (where m is equal to n mode M, M is the number of buffers in the audio playing unit, and m is equal to M when the remainder is 0). Accordingly, since the application processor need not always be activated to play audio, it is possible to reduce the power consumption of a battery.

15 Claims, 9 Drawing Sheets

DATA PROCESSING METHOD FOR AUDIO DATA PLAYBACK, AUDIO DATA PLAYBACK METHOD AND AUDIO DATA PLAYBACK DEVICE

CROSS REFERENCE

This application is based on and claims priority under 35 USC 119 from Korean Patent Application No. 10-2009-0088031, filed on Sep. 17, 2009.

BACKGROUND

1. Technical Field

The present invention relates to a data processing method, an audio playing method, and an audio player, which can reduce power consumption for audio playback.

2. Background Art

In the past, audio players used a method of reading and playing analog audio signals from a recording medium such as a cassette tape. Recently, terminals processing digital data have been provided as the audio players. To enhance the storage efficiency of audio data and the transmission efficiency of audio data through networks, a process of converting audio signals into digital data is generally carried out and a process of compressing and decompressing digital data is also carried out.

FIG. 1 is a block diagram illustrating the basic configuration of a known audio player and FIG. 2 is a flow diagram illustrating a known audio playing method.

Referring to FIG. 1, an audio player 1 includes an application processor 10 having a core 15, an input unit 20, a storage unit 30, a RAM (Random Access Memory) 40, a display unit 50, a DAC (Digital-to-Analog Converter) 60, and a speaker 70.

In step S100, the audio player 1 receives a variety of user commands such as to select an audio file, to play the audio file, to pause the playing, and to delete the audio file through the input unit 20.

The application processor 10 performs a corresponding operation in accordance with the input user command. Hereinafter, it is assumed that the input user command is to play an audio file.

In step S110, the application processor 10 reads an audio file selected in accordance with the user command from the storage unit 30.

In step S120, the core 15 of the application processor 10 decodes the read audio file in cooperation with the RAM 40. The core 15 includes an audio codec and can thus decode the encoded audio file.

In step S130, the application processor 10 transmits audio playback information associated with the decoded audio file to the display unit 50 so as to display a present state. The audio playback information includes the name of the audio file in playback, the total playback time, the played time, and the remaining time.

In step S140, the decoded audio file is PCM (Pulse Code Modulation) data, is converted into analog data by the DAC 60, and is output through the speaker 70.

The audio file is played by repeatedly performing the processes of steps S110 to S140.

In order to minimize the power consumption, when no user command is input for a predetermined time, the display of the display unit 50 in step S130 is stopped to change the display unit 50 to a sleep state.

At the time playing the audio file stored in the storage unit 30, the application processor 10 decodes the audio file in real time and transmits the decoded PCM data to the DAC 60, during the playback time of the audio file.

In this case, since the application processor 10 and the audio codec for the decoding should be maintained in an activated state for the purpose of playing the audio file, there is a problem that the total power consumption increases.

Particularly, in apparatuses such as mobile terminals including a battery having limited power, such an audio file playing method has a problem in that the power consumption increases and the playable time of an audio file decreases.

SUMMARY

Therefore, an advantage of some aspects of the invention is that it provides a data processing method for audio playback and an audio playing method, in which an application processor need not be always activated to play audio, thereby reducing the power consumption of a battery.

Another advantage of some aspects of the invention is that it provides a data processing method for audio playback and an audio play method, in which an application processor need not always be activated to play audio and the application processor can perform other functions even in the course of playing the audio.

According to an aspect of the invention, there are provided a data processing method for audio playback in an application processor and a recording medium having recorded thereon a program for the data processing method.

The data processing method includes: (a) reading n-th audio data which is an n-th part of one or more audio files, which is selected in accordance with a user command, from a storage unit; (b) decoding the read n-th audio data; and (c) storing the decoded n-th audio data in an m-th buffer of an audio playing unit at a subsequent stage. Here, n is a natural number of 1 or more, m is equal to n mode M, M is the number of buffers in the audio playing unit, and m is equal to M when the remainder is 0.

The step of (a) may include reading the n-th audio data depending on the storage capacity of the m-th buffer.

The data processing method may further include: (d) checking whether audio data of the audio file to be read remains in the storage unit; and (e) entering a sleep mode when no audio data remains, and increasing n by 1 and performing the step of (a) again when the audio data remains.

When the audio data remains, the step of (e) may include: (e-1) checking whether any empty buffer exists in the audio playing unit; and (e-2) increasing n by 1 and performing the step of (a) again when an empty buffer exists, and entering the sleep mode when no empty buffer exists.

The step of (e) may further include: (e-3) determining whether a predetermined condition is satisfied in the sleep mode; and (e-4) increasing n by 1 and performing the step of (a) again when the condition is satisfied.

The condition may be one of a condition that it is recognized that one of the buffers in the audio playing unit is empty by monitoring, a condition that a time when one of the buffers is empty is calculated using storage capacities and output rates of the buffers in the audio playing unit and the time is reached, and a condition that the audio playing unit receives an interrupt signal which is generated and output when the audio data is completely output from one of the buffers.

According to another aspect of the invention, there are provided an audio playing method in an audio playing unit connected to an application processor and a recording medium having recorded thereon a program for carrying out the audio playing method.

The audio playing method includes: (a) transmitting n-th audio data stored in an m-th buffer to a digital analog converter (DAC) and outputting the n-th audio data through a speaker at a subsequent stage; (b) checking whether audio data is stored in a buffer which outputs the audio data in the next time; and (c) increasing n by 1 and performing the step of (a) again when the audio data is stored in the buffer, and ending the method when the audio data is not stored. Here, n is a natural number of 1 or more, m is equal to n mode M, M is the number of buffers in the audio playing unit, and m is equal to M when the remainder is 0.

The buffer which outputs the audio data in the next time may be a (m+1)-th buffer when $1 \leq m \leq (M-1)$, and is a first buffer when m is equal to M.

A step of storing an n-th audio data, which is obtained by decoding a part of an audio file n-th time by the use of the application processor, in an m-th buffer may be performed before the step of (a).

The n-th audio data may be divisionally read by the application processor to correspond to the storage capacity of the m-th buffer.

According to another aspect of the invention, there is provided an audio player including: a plurality of buffers that store audio data transmitted from an application processor at a previous stage; a digital-analog converter (DAC) that converts the audio data into analog data and outputs the analog data to a speaker at a subsequent stage; and a processor that sequentially transmits the audio data stored in the buffers in an output order to the DAC.

The processor may generate an interrupt signal and transmit the interrupt signal to the application processor when one of the plurality of buffers is empty by outputting audio data stored in the buffer.

According to another aspect of the invention, there is provided an audio player including: an input unit that receives a user command; a storage unit that stores one or more audio files; a RAM that temporarily stores audio data to be decoded; an audio playing unit that includes a plurality of buffers storing decoded audio data and that sequentially converts the decoded audio data into an analog signal and outputs the analog signal; a speaker that externally outputs the analog signal output from the audio playing unit; and an application processor that sequentially reads audio data of the audio file stored in the storage unit in accordance with the user command, decodes the read audio data in cooperation with the RAM, and transmits the decoded audio data to the audio playing unit.

The audio playing unit may include M buffers and the application processor may read and decode n-th audio data, which is read at the n-th time, by a data amount corresponding to the storage capacity of an m-th buffer. Here, M is a natural number of 2 or more, n may be equal to n mod M, mod may be a remainder function, and m may be equal to M when the remainder is 0.

The application processor may enter a sleep mode when all the buffers of the audio playing unit are full.

The application processor may depart from the sleep mode and enter an operation mode again, when any one is satisfied out of a condition that it is recognized that one of the buffers in the audio playing unit is empty by monitoring, a condition that a time when one of the buffers is empty is calculated using storage capacities and output rates of the buffers in the audio playing unit and the time is reached, and a condition that the audio playing unit receives an interrupt signal which is generated and output when the audio data is completely output from one of the buffers.

Other aspects, features, and advantages will become apparent from the accompanying drawings, the appended claims, and the detailed description.

According to the aspects of the invention, since an application processor need not be always activated to play audio, it is possible to reduce the power consumption of a battery.

According to the aspects of the invention, since an application processor need not always be activated to play audio, the application processor can perform other functions even in the course of playing the audio.

DESCRIPTION OF EXEMPLARY EMBODIMENTS

Figure 1:
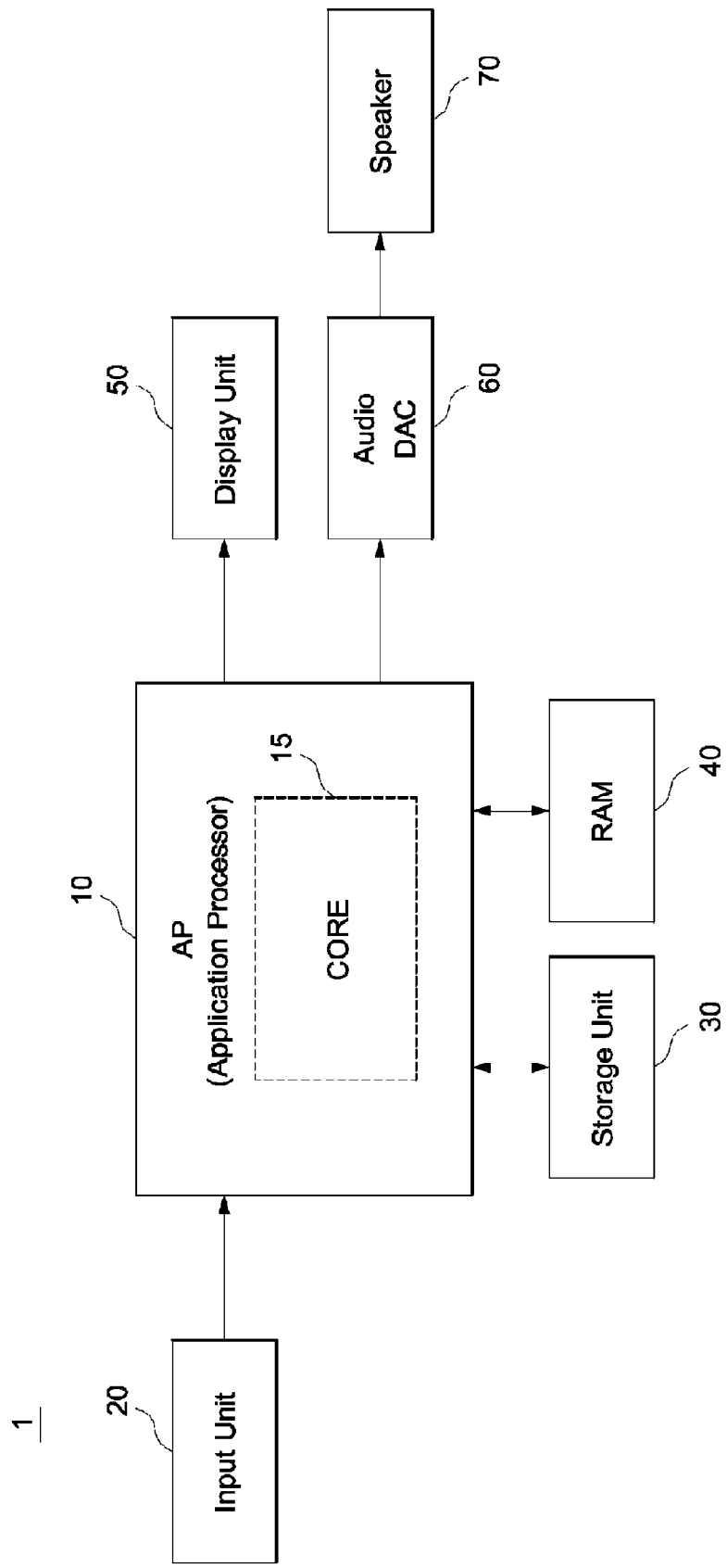
FIG. 1 is a block diagram illustrating the basic configuration of a known audio player.
Figure 2:
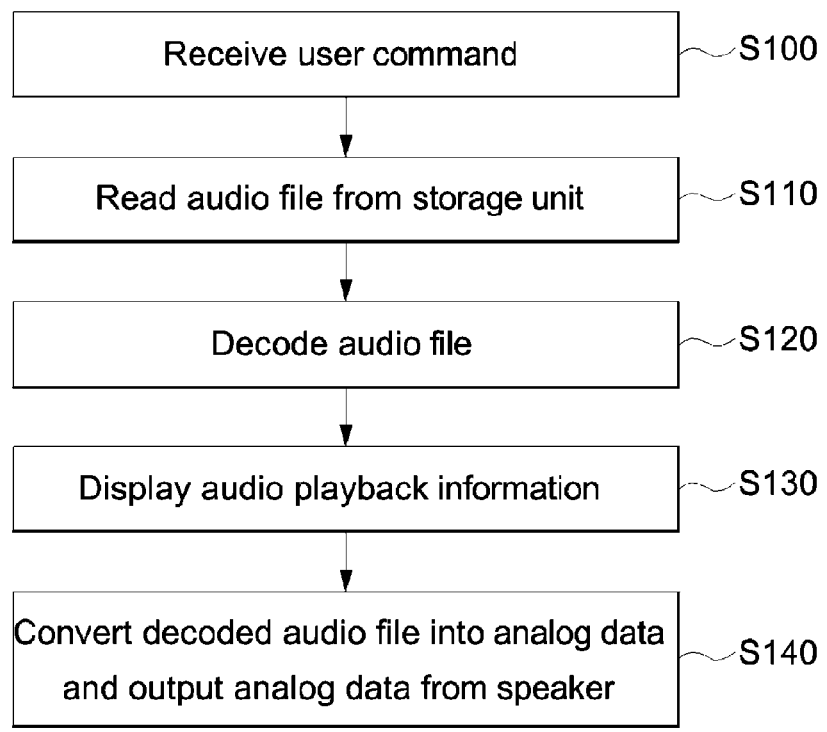
FIG. 2 is a flow diagram illustrating a known audio playing method.

The invention can be variously modified in various forms and specific embodiments will be described and shown in the drawings. However, the embodiments are not intended to limit the invention, but it should be understood that the invention includes all the modifications, equivalents, and replacements belonging to the spirit and the technical scope of the invention. When it is determined that detailed description of known techniques associated with the invention makes the gist of the invention obscure, the detailed description will be omitted.

Terms such as "first" and "second" can be used to describe various elements, but the elements are not limited to the terms. The terms are used only to distinguish one element from another element.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Terms, "unit", "-er(-or)", "module", and the like, described in the specification mean a unit for performing at least one function or operation and can be embodied by hardware, by software, or by a combination of hardware and software.

The exemplary embodiments of the invention will be described now in detail with reference to the accompanying drawings.

Figure 3:
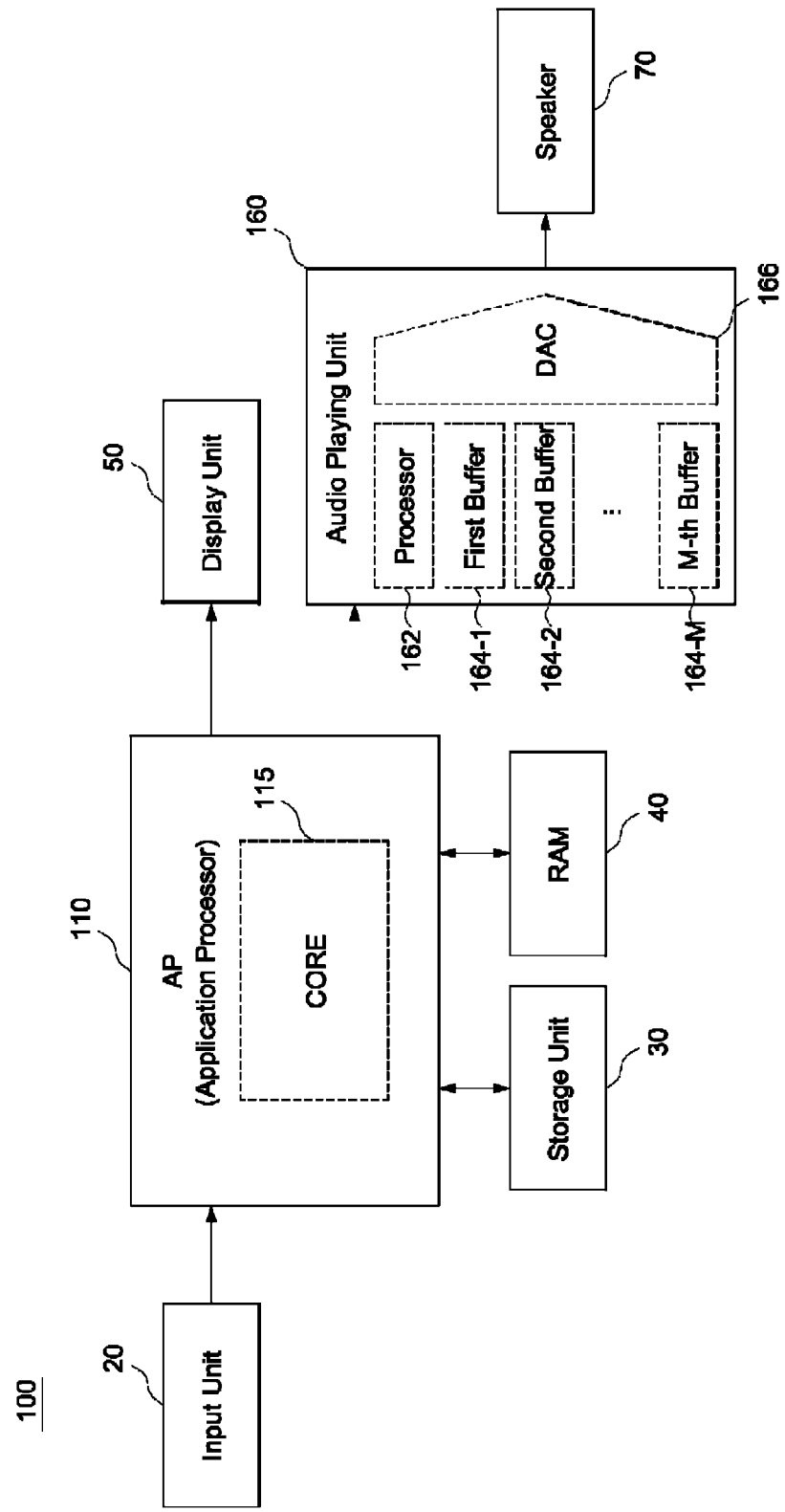
FIG. 3 is a block diagram schematically illustrating the configuration of an audio player according to an exemplary embodiment of the invention.

FIG. 3 is a block diagram schematically illustrating the configuration of an audio player according to an exemplary embodiment of the invention. In FIG. 3, an audio player 100, an application processor 110, a core 115, an input unit 20, a display unit 50, a storage unit 30, a RAM 40, an audio playing unit 160, a processor 162, plural buffers 164, a DAC 166, and a speaker 70 are shown.

The application processor 110 of the audio player 100 according to this exemplary embodiment continuously decodes an audio file, transmits the decoded audio data to the buffers 164 of the audio playing unit 160, and then enters a sleep mode, thereby minimizing the power consumption.

The audio player 100 according to this exemplary embodiment can be applied to mobile devices such as a mobile communication terminal, a PDA (Personal Digital Assistant), a PMP (Portable Multimedia Player), a notebook computer, a netbook, and a navigation terminal so as to perform an audio function.

The input unit 20 receives a variety of user commands such as to select an audio file, to play the audio file, to pause the playback, and to delete the audio file from a user. The input unit 20 may be a keypad, buttons, or a touch screen.

The display unit 50 is connected to the application processor 110 and serves to display information associated with the audio playback. The display unit 50 may be a device such as an LCD display and an OLED display that can display video signals on a screen thereof.

The storage unit 30 is a storage space storing one or more audio files. The storage unit 30 may be a NAND flash or an SD/MMC card that can continuously store data without power supply.

The audio playing unit 160 stores audio data decoded by and transmitted from the application processor 110 in plural buffers 164. The processor 162 transmits the audio data to the DAC 166 so as to convert the audio data into analog data. The speaker 70 outputs the analog data.

It is assumed that the number of buffers 164-1, 164-2, . . . , and 164-M (hereinafter, referred to as "164") is M. Here, M is a natural number of 1 or more. Digital audio data decoded by and transmitted from the application processor 110 is temporarily stored in the buffers. The storage capacities of the buffers 164 may be equal to or different from each other.

It is preferable that the digital audio data is sequentially stored in the buffers 164 in the reading order, which will be described later with reference to the accompanying drawings.

The processor 162 serves to send the decoded audio data stored in the buffers 164 in a predetermined order to the DAC 166.

The DAC 166 converts the digital audio data transmitted from the buffers 164 by the processor 162 into analog data and outputs the analog data to the speaker 70. Here, the digital audio data may be PCM data decoded by the application processor 110.

The audio playing unit 160 generates buffer information on the number of buffers 164, the storage capacities of the buffers 164, and the like and transmits the buffer information to the application processor 110. The information may be recognized in advance by the application processor 110.

When the audio data stored in a specific buffer 164 is completely output, that is, when the corresponding buffer 164 is empty, the audio playing unit 160 generates and outputs an interrupt signal to the application processor 110, whereby audio data subsequent to the audio data stored in the other buffers 164 can be transmitted from the application processor 110 and can be stored in the corresponding buffer 164.

The application processor 110 performs a predetermined operation in accordance with the user command input form the input unit 20. Hereinafter, it is assumed that the input user command is to play audio.

The application processor 110 reads a predetermined amount of audio data of one or more audio files selected. The application processor 110 can control the read audio data to have a data amount corresponding to the storage capacity of the corresponding buffer on the basis of the buffer information or such a data amount that the speaker 70 can continuously output audio.

For this purpose, the application processor 110 can analyze the buffer information and can determine the amount of audio data of the reading order at the time of divisionally reading one or more audio files depending on the number of buffers 164 in the audio playing unit 160 and the storage capacities of the buffers 164.

The application processor 110 decodes the audio data in cooperation with the RAM 40. The RAM 40 is a storage space temporarily storing the audio data so as for the core 115 to perform a decoding operation and may be, for example, an SDRAM.

The application processor 110 generates audio playback information associated with the audio file in decoding and transmits the audio playback information to the display unit 50, whereby the present state is displayed. The audio playback information includes one or more of the title of the audio pile in playback, the total playback time, the played time, and the remaining time.

The decoded audio data, that is, the PCM data, is transmitted to the audio playing unit 160 and is stored in the buffers in order.

The application processor 110 determines whether audio data remains in the storage unit 30, and enters a sleep mode when no audio data remains, for example, when all the audio data of the audio file to be played are decoded and transmitted to the audio playing unit 160.

When all the buffers 164 of the audio playing unit 160 are full in reading and decoding the audio data, the application processor 110 is switched to the sleep mode, thereby reducing the power consumption.

In this case, for example, when the application processor 110 is in the sleep mode, only a monitoring module is activated to monitor the buffers 164 of the audio playing unit 160, recognizes the buffer that is empty, reads and decodes the audio data by an amount that can be stored in the corresponding buffer, and transmits and stores the decoded PCM data to and in the corresponding buffer.

Alternatively, the application processor 110 calculates a time when the corresponding buffer is empty using the storage capacity and the output rate of the buffer in which the audio data presently output from the speaker 70 is stored, is in the sleep mode until the time comes in, is switched to an operation mode at the time to read and decode the audio data by an amount which can be stored in the corresponding buffer, and transmits and stores the decoded PCM data to and in the corresponding buffer. At this time, the audio playing unit 160 processes the decoded PCM data stored in the subsequent buffer.

Alternatively, the application processor 110 is switched to the operation mode in response to an interrupt signal from the audio playing unit 160 in the sleep mode, reads and decodes the audio data on the basis of the interrupt signal, and transmits and stores the decoded PCM data to and in the audio playing unit 160. Here, when the audio data stored in a specific buffer 164 is completely output, the audio playing unit 160 generates the interrupt signal and transmits the interrupt signal to the application processor 110, whereby the application processor 110 is activated and is switched to the operation mode.

In this exemplary embodiment, the application processor 110 or/and the audio playing unit 160 may be embodied in individual chips or in a single chip.

Figure 4:
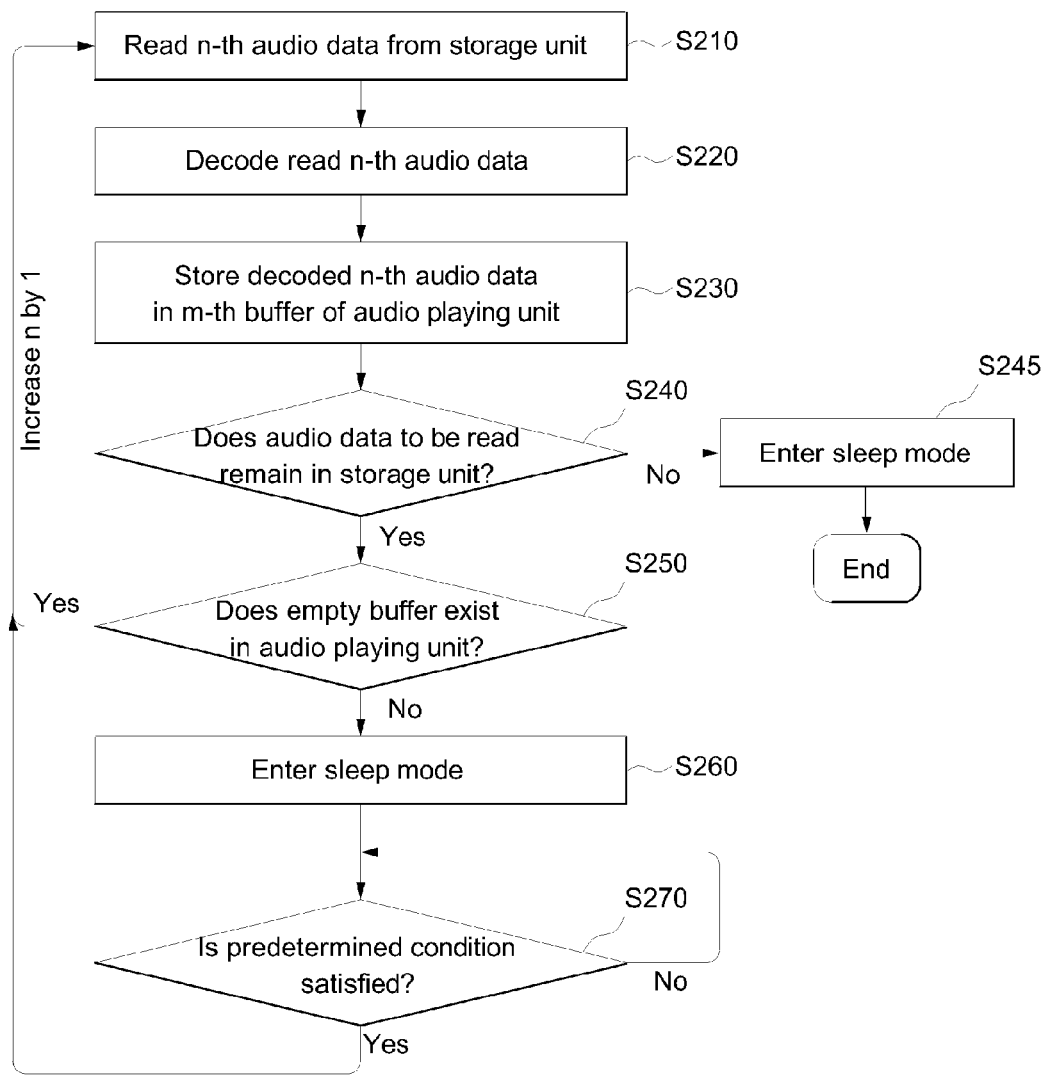
FIG. 4 is a flow diagram illustrating a data processing method in an application processor according to an exemplary embodiment of the invention.
Figure 5:
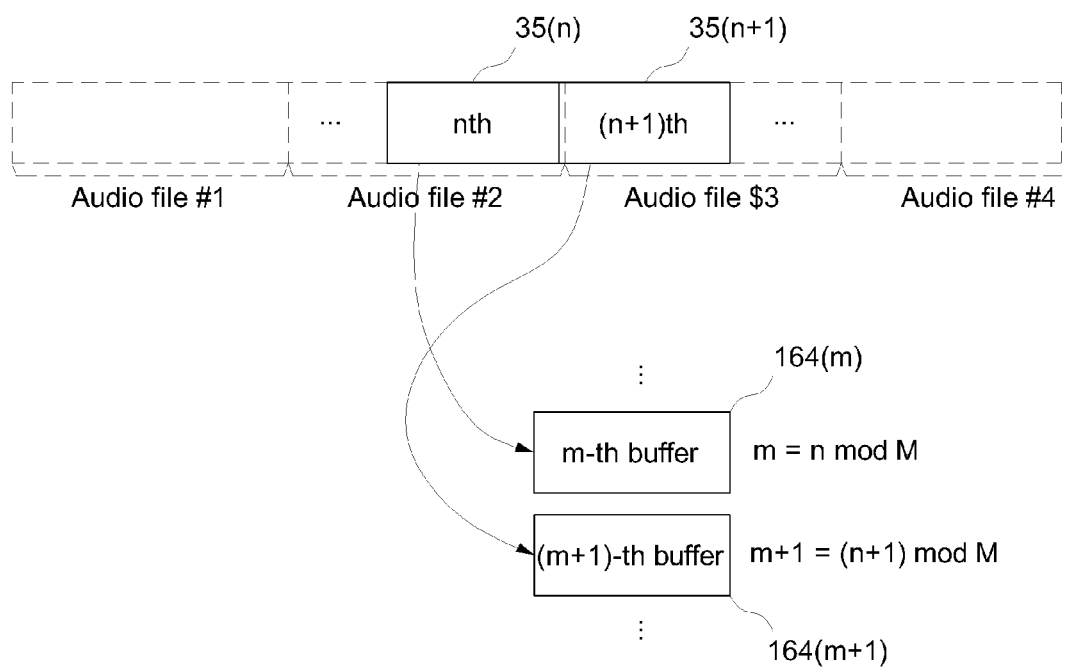
FIG. 5 is a diagram illustrating an order of storing audio data of an audio file in a buffer to correspond to an order of reading the audio data according to an exemplary embodiment of the invention.

FIG. 4 is a flow diagram illustrating a data processing method in an application processor according to an exemplary embodiment of the invention. FIG. 5 is a diagram illustrating the order for storing audio data of an audio file in the buffers to correspond to the reading order thereof according to an exemplary embodiment of the invention.

In step S210, the application processor 110 reads an n-th audio data of one or more audio files selected in accordance with a user command from the storage unit 30. Here, n is a natural number of 1 or more, and the selected one or more audio files can be divided into plural audio data depending on the storage capacities of the buffers and the processing efficiency of the application processor 110.

The tail of an audio file and the head of a next audio file can be classified into individual audio data, or may be read together and used as single audio data.

In step S220, the read n-th audio data is decoded. At this time, the decoding can be carried out in cooperation with the RAM 40.

In step S230, the decoded n-th audio data is transmitted to the audio playing unit 160 and is stored in the m-th buffer 164. Here, m is equal to n mod M and M is the number of buffers in the audio playing unit 160. Here, mod is a function for calculating a remainder, m is a remainder when n is divided by M and is set to be equal to M when the remainder is 0. Since the n-th audio data is stored in the m-th buffer 164, the application processor 110 reads the n-th audio data by the data amount corresponding to the storage capacity of the m-th buffer 164 in step S210. That is, the n-th audio data may have a data amount not greater than the storage capacity of the m-th buffer 164 (that is, equal to or less than the storage capacity).

Here, it is assumed that the audio data read by the application processor 110 are sequentially stored in the first buffer 164-1 to the M-th buffer 164-M of the audio playing unit. The storage capacities of the buffers 164 of the audio playing unit 160 may be equal to or different from each other. As described above, the audio playing unit 160 transmits the buffer information including the number of buffers and the storage capacities of the buffers 164 to the application processor 110, whereby the application processor 110 can check the storage capacity of the buffer 164 in which the audio data to be read in the reading order should be stored and determine the data amount of the audio data to be read.

The application processor 110 sequentially reads and decodes the first to n-th audio data and the respective decoded audio data are sequentially stored in the buffers 164 of the audio playing unit 160.

In step S240, the application processor 110 checks whether audio data to be read remains in the storage unit 30.

In step S245, when no audio data to be read remains, the application processor 110 is switched to the sleep mode and is deactivated, thereby reducing the power consumption.

In step S250, when audio data to be read remains, it is checked whether an empty buffer exists in the audio playing unit 160.

In step S255, when an empty buffer exists, the application processor 110 increases n by 1 and performs again the process of step S210 again.

In step S260, when no empty buffer exists, that is, when all the buffers are full, the application processor 110 is switched to the sleep mode and is deactivated, thereby reducing the power consumption.

In step S270, when a predetermined condition is satisfied, the application processor 110 is switched to the operation mode, increases n by 1, and performs the process of step S210 again. However, when the predetermined condition is not satisfied, the application processor 110 is maintained in the sleep mode and repeatedly checks whether the predetermined condition is satisfied.

Here, the predetermined condition is as follows.

In an exemplary embodiment, when the application processor 110 is in the sleep mode, the monitoring module monitoring the buffers 164 of the audio playing unit 160 is activated. Accordingly, when one of the buffers 164 of the audio playing unit 160 is empty, the monitoring module recognizes that the buffer 164 is empty and switches the application processor 110 to the operation mode.

In another exemplary embodiment, the times when the respective buffers are empty are calculated using the storage capacities of the buffers of the audio playing unit 160 and the output rate from the speaker 70, and the application processor 110 can be switched to the operation mode at the corresponding times.

In another exemplary embodiment, when the interrupt signal generated and output by the audio playing unit 160 when one buffer is empty is received, the application processor 110 can be switched to the operation mode on the basis of the interrupt signal.

When the user command such as to pause the playback or to turn off the power supply is input from the input unit 20 in the course of performing the processes of the steps, the application processor 110 can stop its operation and perform a predetermined operation.

FIG. 5 shows the order for storing audio data of an audio file in the buffers to correspond to the reading order thereof.

The n-th audio data $35(n)$ is audio data read at the n-th time from one or more audio files.

The n-th audio data $35(n)$ is decoded by the application processor 110 and is then stored in the m-th buffer $164(m)$ of the audio playing unit 160. Here, m is equal to n mod M. The (n+1)-th audio data $35(n+1)$ is decoded by the application processor 110 and is then stored in the (m+1)-th buffer 164 $(m+1)$ of the audio playing unit 160. here, (m+1) is equal to (n+1) mod M. As described above, when the remainder is 0, the corresponding audio data is decoded and stored in the M-th buffer.

In this exemplary embodiment, the application processor 110 reads the n-th audio data $35(n)$ to correspond to the storage capacity of the m-th buffer $164(m)$ on the basis of the buffer information. That is, the n-th audio data $35(n)$ preferably has a data amount equal to or less than the allowable capacity of the m-th buffer $164(m)$.

In FIG. 5, the (n+1)-th audio data $35(n+1)$ is the audio data obtained by reading the tail of audio file #2 and the head of audio file #3. However, the invention is not limited to this case, but the tail of the previous audio file and the head of the subsequent audio file may be read as individual audio data.

Figure 6:
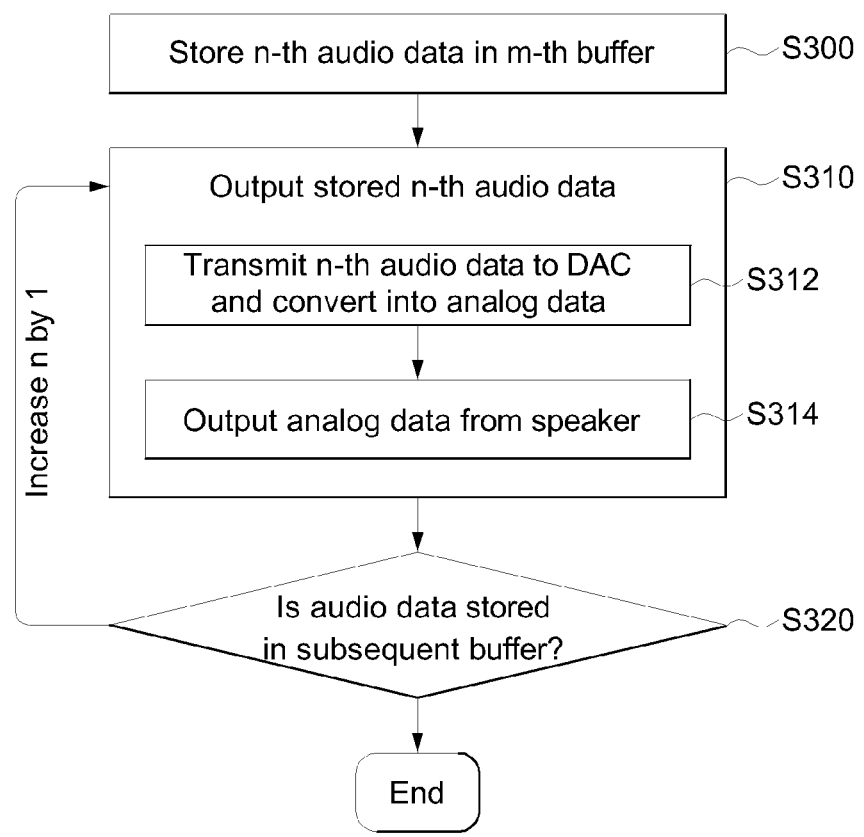
FIG. 6 is a flow diagram illustrating an audio playing method in an audio playing unit according to an exemplary embodiment of the invention.

FIG. 6 is a flow diagram illustrating an audio playing method in an audio playing unit according to an exemplary embodiment of the invention.

In step S300 which is the same as step S230 of FIG. 4, the audio playing unit 160 stores the decoded n-th audio data received from the application processor 110 in the m-th buffer 164.

The processor 162 of the audio playing unit 160 sequentially provides the audio data stored in the buffers 164 to the DAC 166 to convert the audio data into analog data, which is output from the speaker 70. Accordingly, in step S310, the audio playing unit 160 outputs the n-th audio data stored in the m-th buffer 164. Here, n is a natural number of 1 or more, m is equal to n mod M (where m is equal to M when the remainder is 0), and M is the number of buffers of the audio playing unit 160.

The processor 162 provides the n-th audio data stored in the m-th buffer 164 to the DAC 166 in the output order so as to convert the audio data into analog data (step S312), which is output from the speaker 70 (step S314).

In step S320, it is checked whether audio data is stored in the subsequent buffer. Here, the subsequent buffer is the (m+1)-th buffer when $1 \leq m \leq (M-1)$ and is the first buffer when m=M. That is, the storage and output is carried out in the order of the first buffer 164-1, the second buffer 164-2, . . ., the M-th buffer 164-M, the first buffer 164-1, the second buffer 164-2, . . . .

When no audio data is stored in the subsequent buffer, the flow of operations is ended. When audio data is stored in the subsequent buffer, n is increased by 1 and the process of step S310 is performed again.

Here, the process of step S300 can be performed whenever audio data is input from the application processor 110, regardless of n and m.

Assumed that M is 2, the operations of the audio player according to the invention will be described in detail below.

Figure 7A:
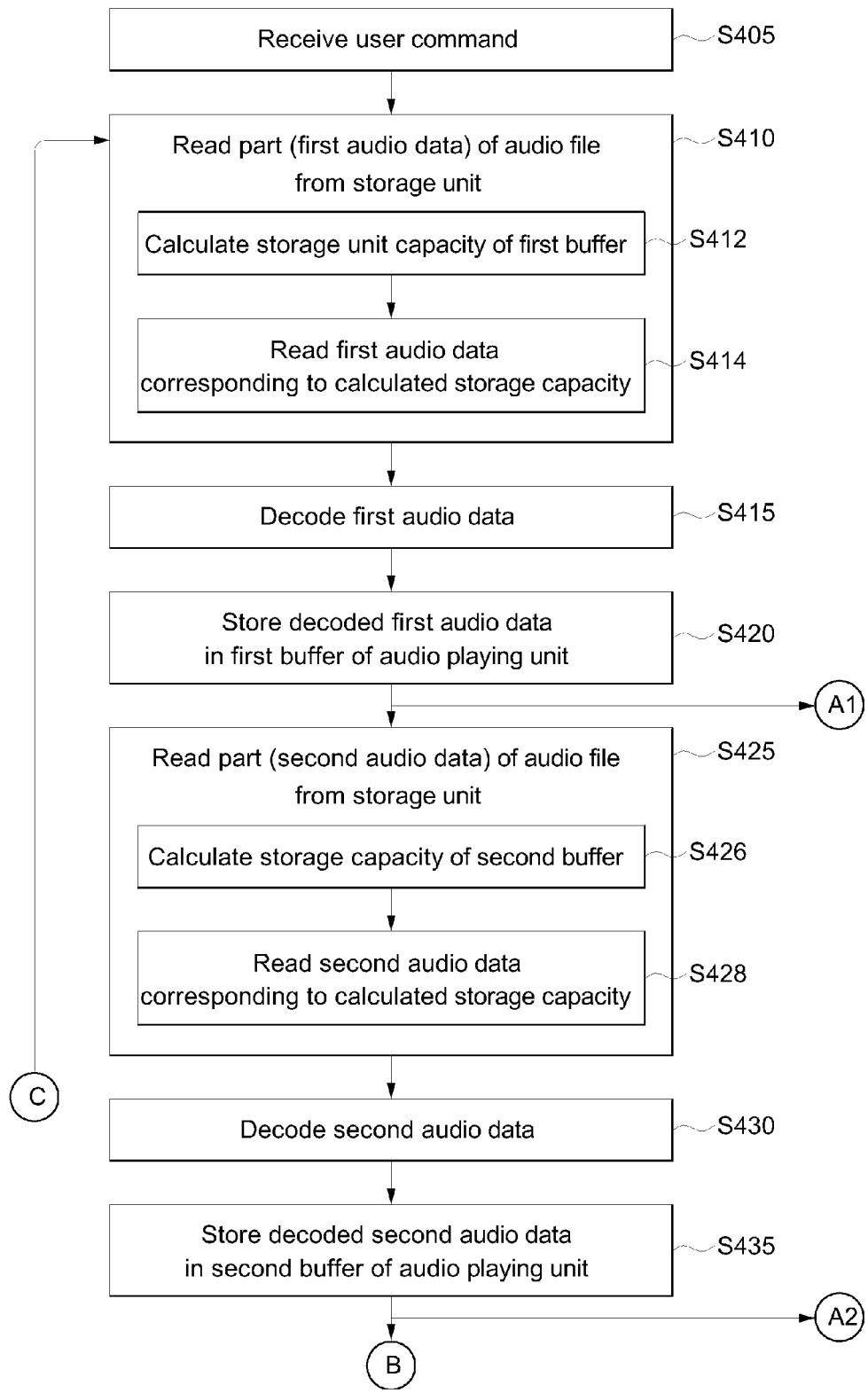
FIGS. 7A and 7B are flow diagrams illustrating a data processing method in an application processor according to an exemplary embodiment of the invention.
Figure 7B:
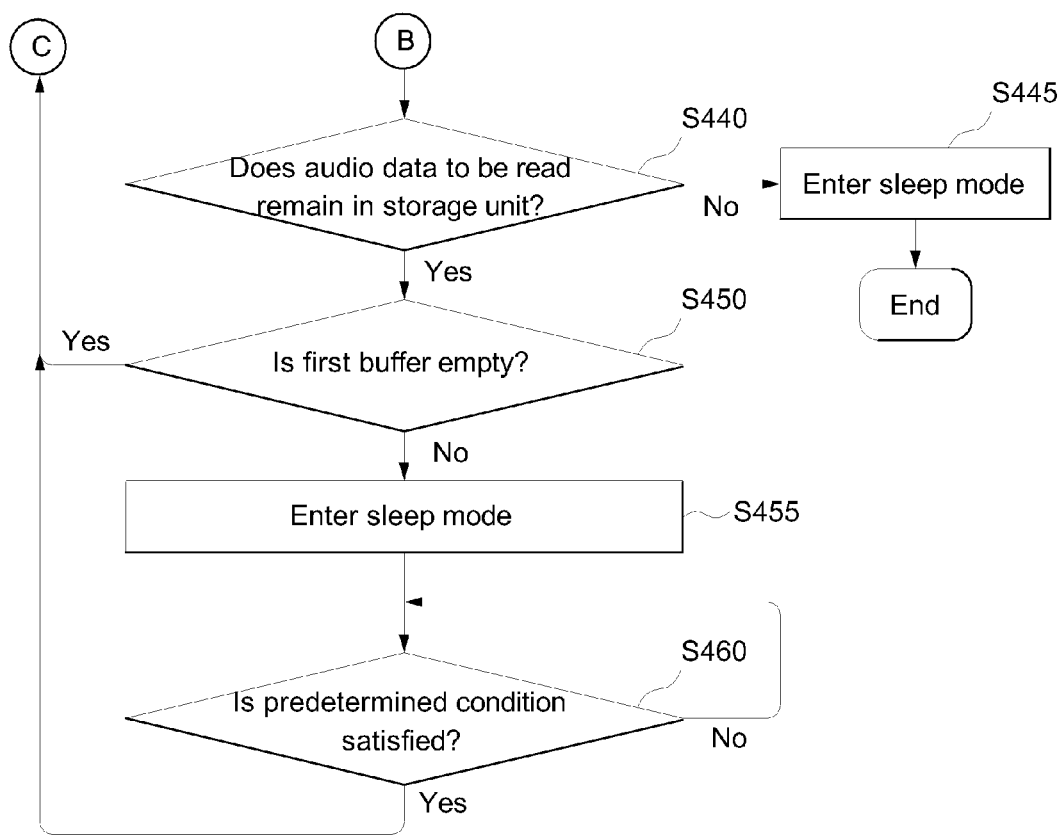

FIGS. 7A and 7B are flow diagrams illustrating a data processing method in the application processor 110 according to an exemplary embodiment of the invention.

Referring to FIG. 7A, the application processor 110 receives a user command to play audio from the input unit 20 in step S405.

In step S410, the application processor 110 reads an audio file selected in accordance with the user command from the storage unit 30. Here, without reading the entire audio file, a part (for example, corresponding to first 10 seconds) of the audio data of the audio file is first read.

Subsequent steps S412 to S414 may be performed to read the first audio data.

In step S412, the application processor 110 can calculate the storage capacity of the first buffer 164-1 in which the first audio data should be stored on the basis of the buffer information of the plural buffers 164. The buffer information may be received and stored from the audio playing unit 160 in advance or may be recognized in advance by the application processor 110.

In step S414, the application processor 110 reads the first audio data by a data amount that can be stored on the basis of the calculated storage capacity of the first buffer 164-1. Alternatively, to cause the audio player 100 to exhibit a rapid reaction time, the data amount may be an amount which can be played at once, regardless of the storage capacity.

In step S415, the core 115 of the application processor 110 decodes the read first audio data in cooperation with the RAM 40.

In step S420, the application processor 110 transmits the decoded first audio data to the audio playing unit 160. The transmitted first audio data is stored in the first buffer 164-1 of the audio playing unit 160.

In step S425, the application processor 110 reads the second audio data subsequent to the first audio data read in step S410.

In reading the second audio data, the processes of subsequent steps S426 to 428 may be performed.

In step S426, the application processor 110 can calculate the storage capacity of the second buffer 164-2 in which the second audio data subsequent to the first audio data should be stored on the basis of the buffer information.

In step S428, the application processor 110 reads the second audio data by a data amount which can be stored on the basis of the calculated storage capacity of the second buffer 164-2. Here, the second audio data may be read by a data amount which can be stored before all the first audio data stored in the first buffer 164-1 is output from the audio playing unit 160.

In step S430, the core 115 of the application processor 110 decodes the read second audio data in cooperation with the RAM 40.

In step S435, the application processor 110 transmits the decoded second audio data to the audio playing unit 160. The transmitted second audio data is stored in the second buffer 164-2 of the audio playing unit 160.

Referring to FIG. 7B, in step S440, the application processor 110 checks whether audio data to be read remains in the storage unit 30.

When no audio data to be read remains, that is, when all the audio data of the selected audio file are completely decoded and transmitted to the audio playing unit 160 and a user does not input any command through the input unit 20 for a predetermined time, the application processor 110 enters the sleep mode in step S445.

When audio data to be read remains, the application processor 110 checks whether the first buffer 164-1 is empty in step S450. The check on whether the first buffer 164-1 is empty can be performed, for example, by the monitoring of the monitoring module, by calculating the time when the first buffer 164-1 is empty on the basis of the storage capacity and the output rate of the first buffer 164-1, or by receiving the interrupt signal generated and output by the audio playing unit 160 when the first buffer 164-1 is empty.

When the first buffer 164-1 is not empty, the application processor 110 is switched to the sleep mode in step S455 and checks whether a predetermined condition is satisfied in step S460.

When the predetermined condition is satisfied, the application processor 110 performs again the above-mentioned processes of steps on subsequent audio data.

On the contrary, when the predetermined condition is not satisfied, the application processor 110 is maintained in the sleep mode and continuously checks whether the predetermined condition is satisfied.

Here, the predetermined condition may be one of a condition that the activated monitoring module recognizes that the first buffer 164-1 is empty, a condition that the time when the first buffer 164-1 is empty is calculated and the time comes in, or when the interrupt signal generated and output by the audio playing unit 160 is received.

Although it is assumed herein that the first buffer 164-1 is empty, the operation of checking whether a predetermined condition is satisfied and reading and decoding audio data to be stored in the second buffer 164-2 may be performed on the second buffer 164-2.

Figure 8:
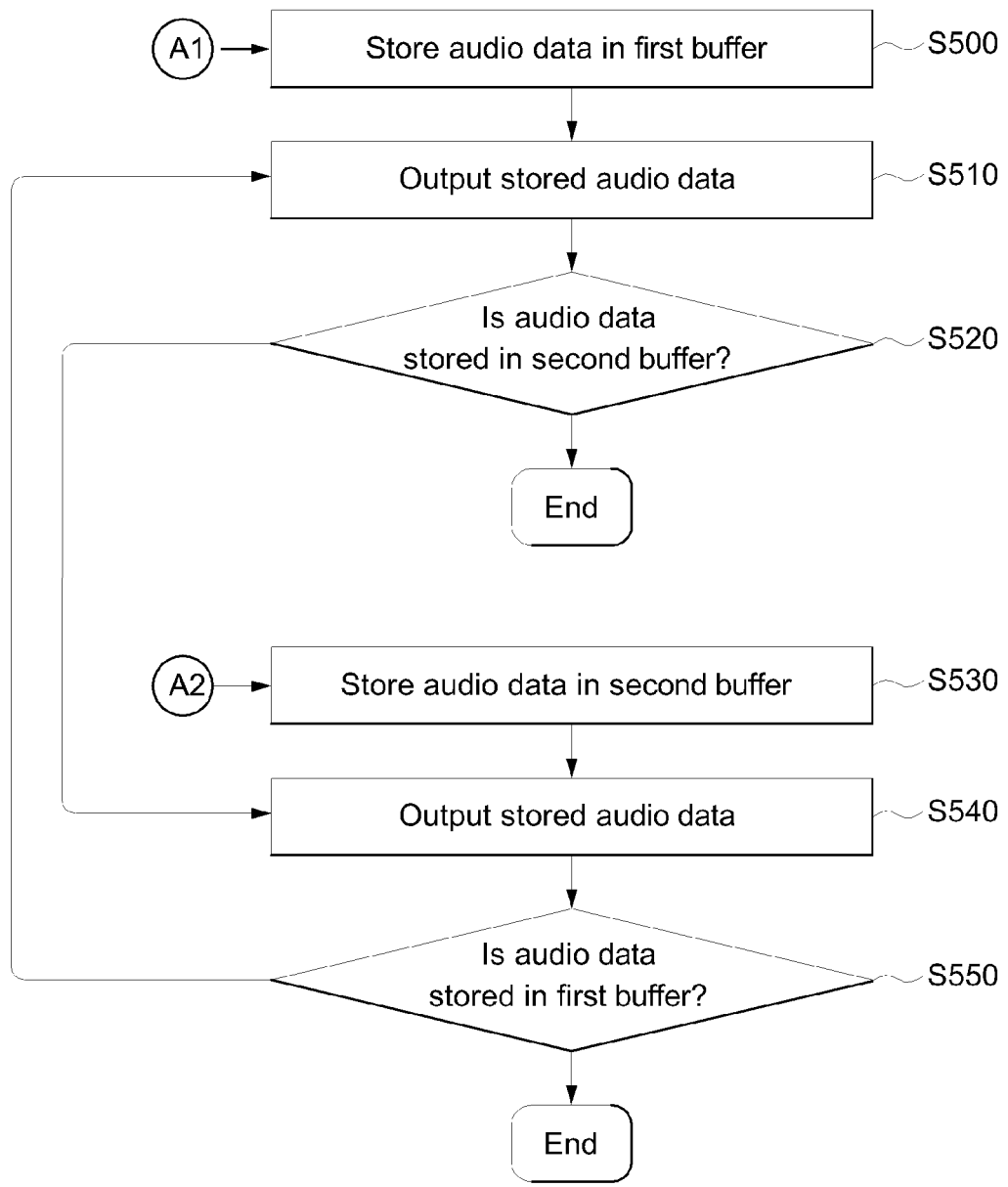
FIG. 8 is a flow diagram illustrating an audio playing method in an audio playing unit according to an exemplary embodiment of the invention.

FIG. 8 is a flow diagram illustrating an audio playing method in the audio playing unit 160 according to an exemplary embodiment of the invention.

In step S500, subsequently to step S420, the (2k+1)-th audio data transmitted from the application processor 110 is stored in the first buffer 164-1. Here, k is an integer equal to or greater than 0.

In step S510, the (2k+1)-th audio data stored in the first buffer 164-1 is provided to the DAC 166 by the processor 162, is converted into analog data, and is then output from the speaker 70.

In some cases, when the first buffer 164-1 is empty by completely outputting the (2k+1)-th audio data stored in the first buffer 164-1, the audio playing unit 160 may generate the interrupt signal and transmit the interrupt signal to the application processor 110.

In the course of performing the process of step S510, subsequently to steps S435, the (2k+2)-th audio data transmitted from the application processor 110 is stored in the second buffer 164-2 in step S530.

In step S520, it is checked whether new audio data is stored in the second buffer 164-2. When the (2k+2)-th audio data is not stored in the second buffer 164-2, the flow of operations is ended. When the (2k+2)-th audio data is stored in the second buffer 164-2, the process of step S540 is performed.

In step S540, after the (2k+1)-th audio data stored in the first buffer 164-1 is completely output, the second audio data stored in the second buffer 164-2 is transmitted to the DAC 166 by the processor 162, is converted into analog data, and is output from the speaker 70.

When new audio data is input from the application processor 110 in the course of performing the process of step S540, the process of step S500 is performed again and the new audio data is stored in the first buffer 164-1.

In step S550, it is checked whether new audio data is stored in the first buffer 164-1. When no audio data is stored in the first buffer 164-1, the flow of operations is ended.

When audio data is stored in the first buffer 164-1, the audio data stored in the buffers 164 are continuously output in step S510.

The above-mentioned data processing method and/or audio playing method may be carried out in a time-series automated procedure by a software program built in a digital processing apparatus. Codes and code segments of the program will be easily obtained by programmers skilled in the art. The program can be stored in a computer-readable recording medium and can be read and executed by a computer to embody the above-mentioned methods.

While the invention has been described with reference to the exemplary embodiments, it will be understood by those skilled in the art that the invention can be modified and changed in various forms without departing from the spirit and scope of the invention described in the appended claims.

What is claimed is:

1. A data processing method for audio playback in an application processor, comprising:
   (a) reading n-th audio data which is an n-th part of one or more audio files, which is selected in accordance with a user command, from a storage unit;
   (b) decoding the read n-th audio data; and
   (c) storing the decoded n-th audio data in an m-th buffer of an audio playing unit at a subsequent stage,
   wherein n is a natural number of 1 or more, m is equal to n mode M, M is the number of buffers in the audio playing unit, and m is equal to M when a remainder is 0.

2. The data processing method according to claim 1, wherein the step of (a) includes reading the n-th audio data depending on the storage capacity of the m-th buffer.

3. The data processing method according to claim 1, further comprising:
   (d) checking whether audio data of the audio file to be read remains in the storage unit; and
   (e) entering a sleep mode when no audio data remains, and increasing n by 1 and performing the step of (a) again when the audio data remains.

4. The data processing method according to claim 3, wherein when the audio data remains, the step of (e) includes:
   (e-1) checking whether any empty buffer exists in the audio playing unit; and
   (e-2) increasing n by 1 and performing the step of (a) again when an empty buffer exists, and entering the sleep mode when no empty buffer exists.

5. The data processing method according to claim 4, wherein the step of (e) further includes:
   (e-3) determining whether a predetermined condition is satisfied in the sleep mode; and
   (e-4) increasing n by 1 and performing the step of (a) again when the predetermined condition is satisfied.

6. The data processing method according to claim 5, wherein the predetermined condition is one of a condition that it is recognized that one of the buffers in the audio playing unit is empty by monitoring, a condition that a time when one of the buffers is empty is calculated using storage capacities and output rates of the buffers in the audio playing unit and the time is reached, and a condition that the audio playing unit receives an interrupt signal which is generated and output when the audio data is completely output from one of the buffers.

7. An audio playing method in an audio playing unit connected to an application processor, comprising:
   (a) transmitting n-th audio data stored in an m-th buffer to a digital analog converter (DAC) and outputting the n-th audio data through a speaker at a subsequent stage;
   (b) checking whether audio data is stored in a subsequent buffer which outputs the audio data in the next time; and
   (c) increasing n by 1 and performing the step of (a) again when the audio data is stored in the subsequent buffer, and ending the method when the audio data is not stored,
   wherein n is a natural number of 1 or more, m is equal to n mode M, M is the number of buffers in the audio playing unit, and m is equal to M when a remainder is 0.

8. The audio playing method according to claim 7, wherein the subsequent buffer which outputs the audio data in the next time is a (m+1)-th buffer when $1 \leq m \leq (M-1)$, and is a first buffer when m is equal to M.

9. The audio playing method according to claim 7, wherein a step of storing the n-th audio data, which is obtained by decoding a part of an audio file n-th time by the use of the application processor, in the m-th buffer is performed before the step of (a).

10. The audio playing method according to claim 7, wherein the n-th audio data is divisionally read by the application processor to correspond to the storage capacity of the m-th buffer.

11. An audio player comprising:
    a plurality of buffers that store audio data transmitted from an application processor at a previous stage;
    a digital-analog converter (DAC) that converts the audio data into analog data and outputs the analog data to a speaker at a subsequent stage; and
    a processor that sequentially transmits the audio data stored in the buffers in an output order to the DAC,
    wherein the processor (a) transmits n-th audio data stored in an m-th buffer to the DAC and outputs the n-th audio data through a speaker at a subsequent stage,
    (b) checks whether audio data is stored in a subsequent buffer which outputs the audio data in the next time, and
    (c) increases n by 1 and performs the step of (a) again when the audio data is stored in the subsequent buffer, and wherein n is a natural number of 1 or more, m is equal to n mode M, M is the number of buffers in the audio player, and m is equal to M when a remainder is 0.

12. The audio player according to claim 11, wherein the processor generates an interrupt signal and transmits the interrupt signal to the application processor when one of the plurality of buffers is empty by outputting audio data stored in the buffer.

13. An audio player comprising:
an input unit that receives a user command;
a storage unit that stores one or more audio files;
a RAM that temporarily stores audio data to be decoded;
an audio playing unit that includes a plurality of buffers storing decoded audio data and that sequentially converts the decoded audio data into an analog signal and outputs the analog signal;
a speaker that externally outputs the analog signal output from the audio playing unit; and
an application processor that sequentially reads audio data of the one or more audio files stored in the storage unit in accordance with a user command, decodes the read audio data in cooperation with the RAM, and transmits the decoded audio data to the audio playing unit,
wherein the audio playing unit includes M buffers,
wherein the application processor reads and decodes n-th audio data, which is read at the n-th time, by a data amount corresponding to the storage capacity of an m-th buffer, and
wherein M is a natural number of 2 or more, n is equal to n mod M, mod is a remainder function, and m is equal to M when a remainder is 0.

14. The audio player according to claim 13, wherein the application processor enters a sleep mode when all the buffers of the audio playing unit are full.

15. The audio player according to claim 14, wherein the application processor departs from the sleep mode and enters an operation mode again, when any one is satisfied out of a condition that it is recognized that one of the buffers in the audio playing unit is empty by monitoring, a condition that a time when one of the buffers is empty is calculated using storage capacities and output rates of the buffers in the audio playing unit and the time is reached, and a condition that the audio playing unit receives an interrupt signal which is generated and output when the audio data is completely output from one of the buffers.

* * * * *